United States Patent
Kolen

(10) Patent No.: US 7,219,033 B2
(45) Date of Patent: May 15, 2007

(54) SINGLE/MULTIPLE AXES SIX DEGREES OF FREEDOM (6 DOF) INERTIAL MOTION CAPTURE SYSTEM WITH INITIAL ORIENTATION DETERMINATION CAPABILITY

(75) Inventor: Paul T. Kolen, Encinitas, CA (US)

(73) Assignee: Magneto Inertial Sensing Technology, Inc., Carlsbad, CA (US)

( * ) Notice: Subject to any disclaimer, the term of this patent is extended or adjusted under 35 U.S.C. 154(b) by 0 days.

(21) Appl. No.: 11/059,163

(22) Filed: Feb. 15, 2005

(65) Prior Publication Data

US 2006/0184336 A1 Aug. 17, 2006

(51) Int. Cl.
*G01C 17/00* (2006.01)

(52) U.S. Cl. ................................... 702/150
(58) Field of Classification Search ........... 702/150, 702/92, 94, 155
See application file for complete search history.

(56) References Cited

U.S. PATENT DOCUMENTS

| | | | | |
|---|---|---|---|---|
| 4,718,276 A | 1/1988 | Laughlin | | 73/516 |
| 5,831,162 A | 11/1998 | Sparks | | 73/504 |
| 6,504,385 B2 | 1/2003 | Hartwell | | 324/662 |
| 6,513,380 B2 | 2/2003 | Reeds | | 73/504 |
| 6,552,531 B1 | 4/2003 | Fey | | 324/207 |
| 6,584,846 B2 | 7/2003 | Wesselak | | 73/514 |
| 6,594,616 B2 * | 7/2003 | Zhang et al. | | 702/152 |
| 2004/0088136 A1 * | 5/2004 | Ashe | | 702/150 |
| 2004/0211258 A1 * | 10/2004 | Geen | | 73/510 |
| 2005/0024507 A1 * | 2/2005 | Katayama et al. | | 348/231.99 |

* cited by examiner

Primary Examiner—John Barlow
Assistant Examiner—Tung S. Lau
(74) Attorney, Agent, or Firm—Fish & Richardson P.C.

(57) ABSTRACT

A highly miniaturized electronic data acquisition system includes MEMS sensors that can be embedded onto moving device without affecting the static/dynamic motion characteristics of the device. The basic inertial magnetic motion capture (IMMCAP) module consists of a 3D printed circuit board having MEMS sensors configured to provide a tri-axial accelerometer; a tri-axial gyroscope, and a tri-axial magnetometer all in communication with analog to digital converters to convert the analog motion data to digital data for determining classic inertial measurement and change in spatial orientation (rho, theta, phi) and linear translation (x, y, z) relative to a fixed external coordinate system as well as the initial spatial orientation relative to the know relationship of the earth magnetic and gravitational fields. The data stream from the IMMCAP modules will allow the reconstruction of the time series of the 6 degrees of freedom for each rigid axis associated with each independent IMMCAP module.

19 Claims, 11 Drawing Sheets

SINGLE/MULTIPLE AXES SIX DEGREES OF FREEDOM (6 DOF) INERTIAL MOTION CAPTURE SYSTEM WITH INITIAL ORIENTATION DETERMINATION CAPABILITY

FIELD OF THE INVENTION

The present invention relates generally to the field of motion sensing devices. The present invention is more particularly, though not exclusively, useful as a 6 Degree of freedom plus initial spatial orientation inertial motion measurement device for single/multiple axes applications for use in motion capture applications. The present invention is also useful for proving real-time analysis and feedback to a particular motion as compared to an optimal, or predetermined, motion.

BACKGROUND OF THE INVENTION

During recent years, there has been an increasing interest in the development of sophisticated devices capable of sensing the 6 degrees of freedom motion of a single or multiple axes rigid body in 3 dimensional space. The devices which have been developed to sense these motion components have, in the past, been rather bulky, high power, and expensive. For instance, in order to sense angular and linear motion, both gyroscopes and accelerometers have typically been used in tandem to provide the motion information necessary for most applications. However, these devices have been disfavored because of their bulk, high power requirements, and high cost.

There have been improvements in recent devices which require less power, are more precise, and slightly less bulky than prior devices. These more modern motion sensing devices, however, are still rather bulky and as a result, are often difficult to integrate into the device which is to be measured. This is particularly problematic when there is a desire to measure the motion of a small, lightweight device, such as a piece of sports equipment where the addition of bulky hardware would change the nature of the movement or use of the device.

One of the earliest attempts at a miniaturized motion sensing device is disclosed in U.S. Pat. No. 4,718,276 which issued in January of 1988 to Laughlin for an invention entitled "Angular motion sensor." The '276 patent discloses a solid electrode in the core of an angular motion sensor has a body of conductive fluid confined therein within an annular flux gap between axially spaced magnets. An arrangement of slots in the walls of the electrode modifies the current, induced in the fluid by inertial displacement, into a circumferential component, which is inductively coupled to an output winding from which an output signal is obtained.

Attempts to decrease the physical size of motion sensing components continued as presented in U.S. Pat. No. 5,831,162 which issued in November of 1998 to Sparks for an invention entitled "Silicon micromachined motion sensor and method of making" discloses a method for making and vacuum packaging a silicon micromachined motion sensor, such as a gyroscope, at the chip level. The method involves micromachining a trench-isolated sensing element in a sensing chip, and then attaching a circuit chip to enclose the sensing element. Solder bumps serve to attach the circuit chip to the sensing chip, form a hermetic seal to enable vacuum-packaging of the sensor, and electrically interconnect the sensing chip with the circuit chip. Conductive runners formed on the enclosed surface of the circuit chip serve to electrically interconnect the sensing element with its associated sensing structures.

The recent development of lightweight angular and linear motion sensors involving MEMS components has led to innovations such as that disclosed in U.S. Pat. No. 6,504,385 which issued in January of 2003 to Hartwell for an invention entitled "Three-axis motion sensor." The '385 patent discloses a microelectromechanical system (MEMS) motion sensor for detecting movement in three dimensions of a semiconductor wafer structure.

The MEMS device has top, middle, and bottom layers, with a movable portion, or "mover," attached to the middle layer by a flexure that allows the mover to move in three dimensions relative to the layers. The mover has mover electrodes that create a capacitance with counter electrodes positioned on an adjacent layer. The capacitance changes as the mover moves. A capacitance detector receives signals from the electrodes and detects movement of the mover based on the change in capacitances. The MEMS device processes the detected capacitances to determine the nature of the movement of the mover. The mover and counter electrodes comprise x-y electrodes for detecting movement in an x-y plane parallel to the middle layer and z electrodes for detecting movement in a direction orthogonal to the x-y plane.

While the device of the '385 patent is capable of providing measured signals corresponding to three axes of freedom, it nevertheless does not provide rate information for overall motion of the device.

Continued development of MEMS sensors includes a sensor as presented in U.S. Pat. No. 6,513,380 which issued in February of 2003 to Reeds for an invention entitled "MEMS sensor with single central anchor and motion-limiting connection geometry."

The '380 patent discloses a MEMS sensor including a sense element and a single anchor that supports the sense element arranged in a central hub-like fashion that reduces the effects of thermal stress. Usually, two or more anchors are required to suitably constrain the sense element's motion. The anchor disclosed in the '380 patent, however, supports the sense element with connection elements having a connection geometry that substantially limits the motion of the sense element to a single-degree-of-freedom.

The incorporation of MEMS sensors into motion capture devices provides for a much lighter solution than typical motion sensors. However, the device of the '380 patent fails to account for the directional signals typically provided by a gyroscope in other sensors, and thus, is not useful as a complete motion sensor component. Further, the method of attachment of the various MEMS components does not provide a robust sensor capable of incorporation into items being measured.

An alternative solution to motion sensing is presented in U.S. Pat. No. 6,552,531 which issued in April of 2003 to Fey for an invention entitled "Method and circuit for processing signals for a motion sensor." The '531 patent discloses a method and a circuit arrangement for processing signals for an active motion sensor which generates at least one first sequence of input pulses that contain motion information. By at least one integrating filter circuit, each input pulse of a pulse train is integrated, and an associated output pulse is generated during a period in which the integrated signal is in excess of a predeterminable second threshold value after a predeterminable first threshold value has been exceeded so that the output pulse has a time delay with respect to the input pulse. As a result, noises of a duration which is shorter than the delay time are effectively suppressed.

The methods for minimizing noise and improving the quality of the motion captured signal taught in the '531 patent make this device impractical for motion capture applications involving higher rates of change. This is particularly so given the delays which are necessarily implemented into the sensing circuitry to improve its noise tolerance, and thus make this device unresponsive for providing motion information for rapidly moving items.

A more recent solution that has been proposed for measuring motion is presented in U.S. Pat. No. 6,584,846 which issued in July of 2003 to Wesselak for an invention entitled "Magnetic motion sensor." The '846 patent discloses a magnetic motion sensor, having a mobile magnet that generates an essentially homogeneous magnetic field with a magnetic-field direction, and having a coupling element which is stationary within the magnetic field, and wherein a motion-dependent physical quantity is induced in the coupling element when the magnet moves perpendicular to the magnetic-field direction, and the induced quantity is measured and output by a sampling element.

While the device disclosed in the '846 patent may generate a motion-based signal that is measurable, it is woefully susceptible to external magnetic fields. As a result, this device is not particularly useful in applications where the magnetic field may vary over time, or may vary between uses.

Most recently, United States Patent Application No. 20040211258 was published in October of 2004 by Geen for an invention entitled "Six degree-of-freedom micro-machined multi-sensor." The '258 application discloses a six degree-of-freedom micro-machined multi-sensor that provides 3-axes of acceleration sensing, and 3-axes of angular rate sensing, in a single multi-sensor device. The six degree-of-freedom multi-sensor device includes a first multi-sensor substructure providing 2-axes of acceleration sensing and 1-axis of angular rate sensing, and a second multi-sensor substructure providing a third axis of acceleration sensing, and second and third axes of angular rate sensing. The first and second multi-sensor substructures are implemented on respective substrates within the six degree-of-freedom multi-sensor device.

In light of the above, there is a need to provide a motion sensing apparatus and system that is capable of sensing the spatial 6 degrees of freedom and which is relatively small, lightweight, low power suitable for portable applications, and relatively cost competitive.

SUMMARY OF THE INVENTION

What is being described is a highly miniaturized electronic data acquisition system incorporating MEMS (Micro Electro Mechanical System) sensors that can be embedded onto moving device, such as a sport apparatus shaft, without affecting the static/dynamic motion characteristics of the device. Applications of the technology and apparatus of the present invention include, but are not in any way limited to, golf clubs, baseball bats, tennis rackets, hockey sticks, etc.

In a preferred embodiment, the present invention includes a basic inertial magnetic motion capture (IMMCAP) module consisting of the following sub-systems designed onto a unique highly miniaturized 3D printed circuit board (PCB) and includes a tri-axial MEMS accelerometer; a tri-axial MEMS rate sensor (gyroscope), a tri-axial MEMS magnetometer, Analog to Digital converter (ADC), digital to analog converter (DAC), and suitable analog signal conditioning electronics for all 9 MEMS sensors. Additionally, an embedded temperature sensor allows the sensor data to be corrected for temperature related variations in both real-time and post-process.

The tri-axial accelerometer and rate sensor comprise a classic inertial measurement unit capable of determining the change in spatial orientation (rho, theta, phi) and linear translation (x, y, z) relative to a fixed external coordinate system. The addition of the tri-axial magnetometer, used in conjunction with the tri-axial accelerometer, provides the capability to determine the absolute orientation of the IMMCAP, and the corresponding axis, relative to the local 1 g gravity vector and the local magnetic vector. Additionally, the magnetometer acts as a back-up rate sensor in case the rate sensors saturate due to excessive rates of rotation or large acceleration induced gyro output errors.

The IMMCAP module is designed to operate under direct control of a dedicated, local micro-processor (uP). Each of the nine MEMS sensors generates an analog voltage that must be amplified, filtered, and offset corrected under the control of the local uP via the ADC, DAC, and analog signal processing contained within the IMMCAP.

In addition to the control of the IMMCAP functions, the local microprocessor also formats the data stream generated by the IMMCAP for transmission via a dedicated radio frequency (RF) digital data link. Finally, a DC-DC converter and voltage regulator provide the stable power supply voltages needed by the analog and digital elements of the IMMCAP and microprocessor from a single primary or secondary battery cell.

Depending on the specific IMMCAP application, the associated support electronics may vary. In an application which is designed to capture the 6 DOE of a single rigid body, i.e., golf shaft, tennis racket, baseball bat, a common format will most likely be incorporated. In some embodiments, the IMMCAP module will be an independent sub-system from the rest of the support electronics in the appliance, and in others the essential components of the IMMCAP module will be integrated into a single system with the support electronics. The digital RE data stream from the appliance will be transmitted via a short range ISM (industrial, scientific and medical) band transceiver to an associated electronics package designed to process the data stream for the specific application of the motion measurement system. For instance, the present invention can include an acoustic, optical or tactical biofeedback system for providing real-time information regarding body motion relative to some pre-acquired motion file.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF PREFERRED EMBODIMENTS

In a preferred embodiment, one motion capturing system of the present invention includes a motion sensing module, and microprocessor controlled interfaces which capture the motion data and analyze the data for real-time feedback, or for post-processing analysis. As will be discussed further below, there are numerous applications of the motion capture system of the present invention. However, in order to discuss these various applications, a basic discussion of the hardware of the present invention is provided.

Figure 1:
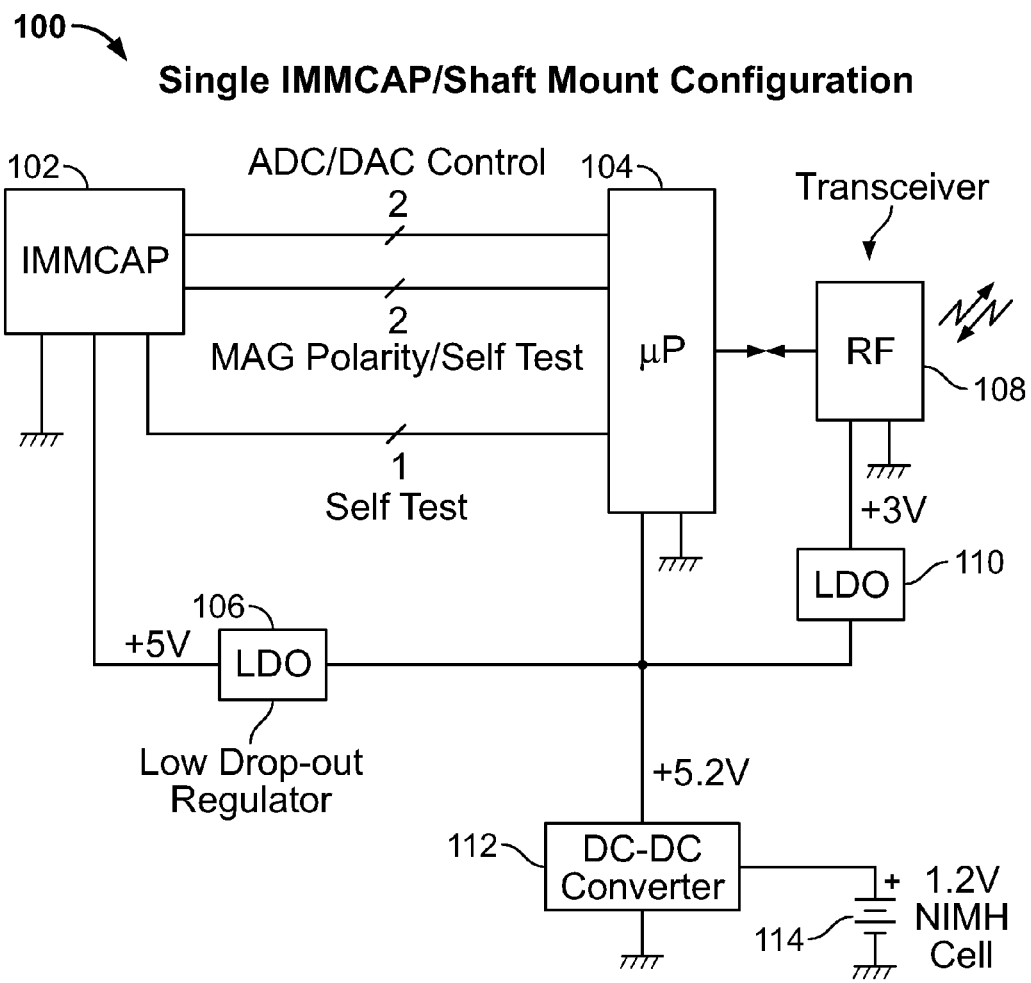
FIG. 1 is a block diagram of a portion of the motion capture system of the present invention showing a basic configuration for a single axis inertial magnetic motion capture sensor array in electrical communication with filtering hardware and a microprocessor which provides a signal to a radio frequency (RF) transceiver.

Referring initially to FIG. 1, a block diagram of a portion of the motion capture system of the present invention is shown and generally designated 100. Motion capture system 100 includes an inertial magnetic motion capture system (IMMCAP) module 102 in electrical connection with a microprocessor 104 which provides control signals to the module 102, and receives status information from the module 102 to facilitate proper operation. Analog output signals generated within the IMMCAP module 102 are internally converted to 12 bit digital representations via an imbedded analog to digital converter (ADC). The digitized signals from the module 102 are relayed through microprocessor 104 to RF transceiver 108 for transmission to a remote receiver (not shown in this Figure). A pair of low drop out voltage regulators 106 and 110 provides a constant voltage supply from DC-DC converter 112 and battery 114 to optimize battery life and reduce the noise generated by the DC-DC converter 112.

Figure 2:
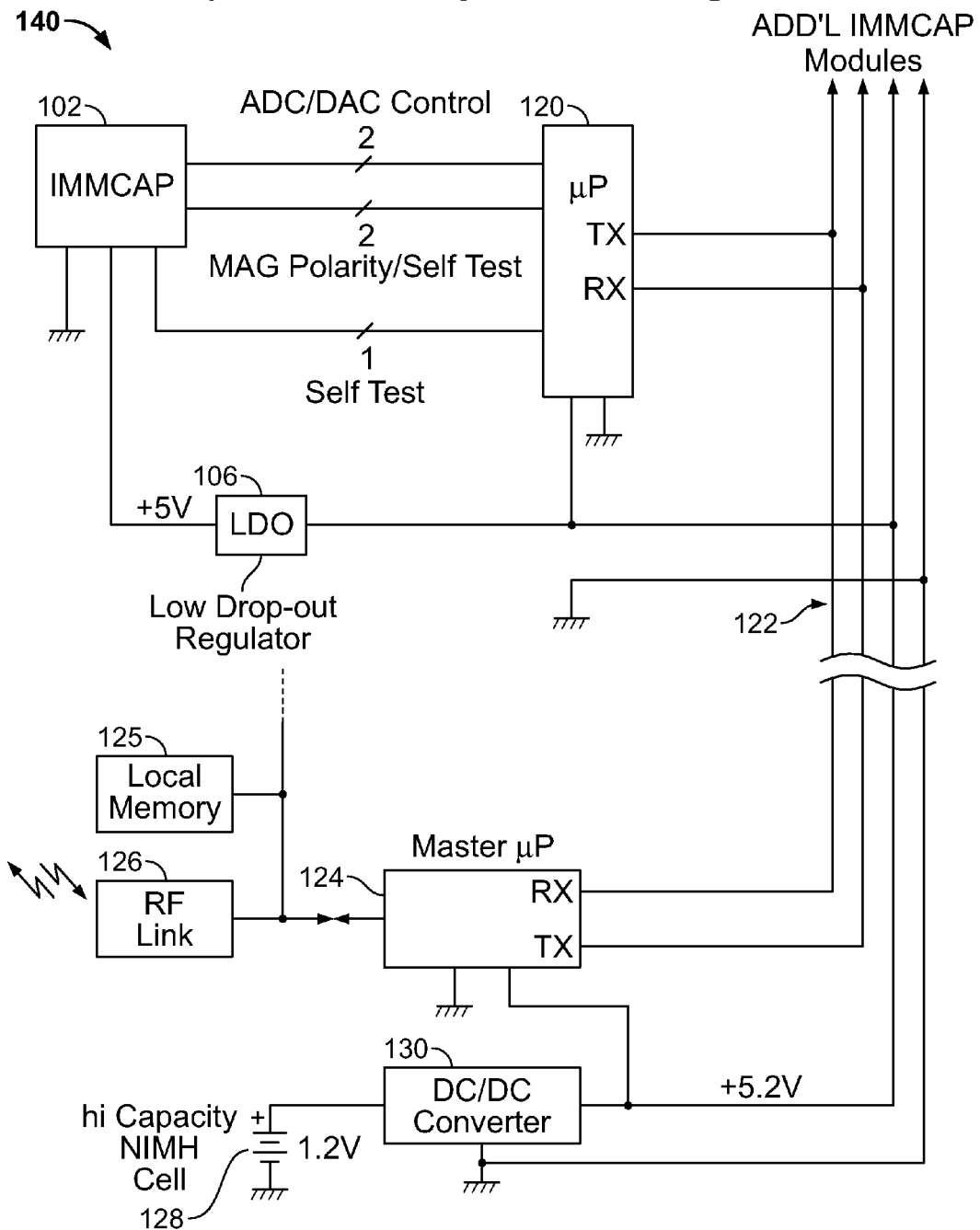
FIG. 2 is a block diagram of an alternative embodiment of a portion of the motion capture system of the present invention showing a basic configuration for a multiple axes inertial magnetic motion capture sensor array in electrical communication with filtering hardware and a microprocessor which provides a signal to a data bus for interfacing with other motion capture sensor arrays.

As an alternative to the motion capture system shown in FIG. 1, a multi-sensor system is presented in conjunction with FIG. 2. More specifically, FIG. 2 is a block diagram of an alternative embodiment of a portion of the motion capture system of the present invention and generally designated 140. Motion capture system 140 includes an IMMCAP module 102 in electrical connection with a microprocessor 120. The data from the module 102 is processed by microprocessor 120 and placed on a data exchange bus 122. In a preferred embodiment wherein there are multiple modules 102 and microprocessors 120, data from these multiple devices may be easily exchanged over the data bus 122.

A master microprocessor 124 receives data from data bus 122 for storage in a local memory 125, and/or for transmission via RF link 126 to a receiver (not shown this Figure). For portable applications, a battery 128 provides a voltage to DC-DC converter 130 which in turn provides power to motion capture system 140. Additional low drop out regulators 106 may be incorporated to ensure low noise and stable voltage levels which can be particularly important to minimize sensing errors in the module 102.

Figure 3:
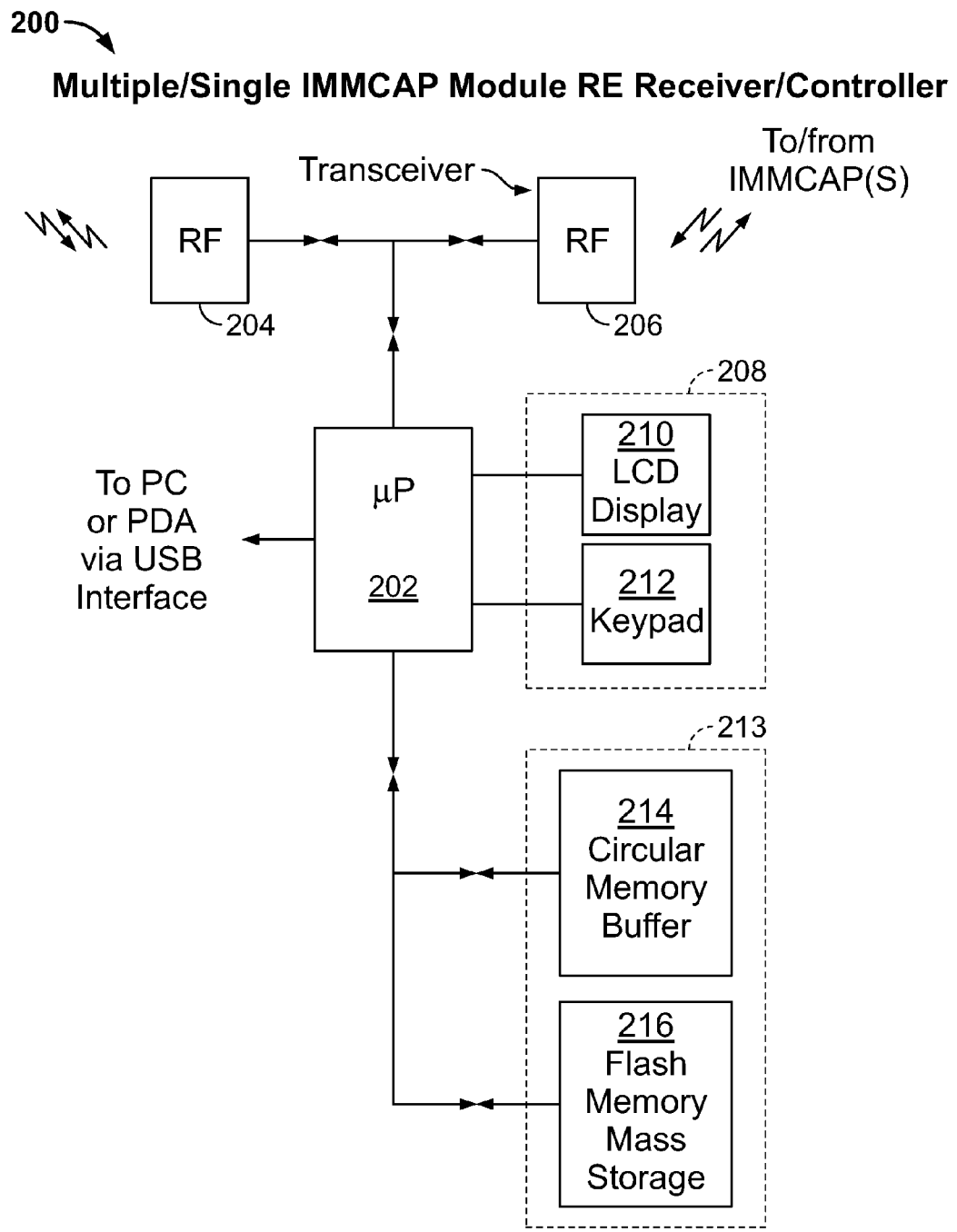
FIG. 3 is a block diagram of a portion of the motion capture system of the present invention showing a basic configuration of multiple or single RF transceivers to receive data from single or multiple remote motion capture sensor arrays for processing by a microprocessor, and for providing data storage, and a user interface for providing control of the system.

Referring now to FIG. 3, a block diagram of a receiver portion of the motion capture system of the present invention is shown and generally designated 200. Receiver portion 200 includes a basic configuration of a microprocessor 202 in connection with multi-channel capable (multiple) RF transceivers 204 and 206 to receive RF data from remote motion capture sensor arrays 100 and 140, for example, for processing by microprocessor 202.

A user interface 208 is provided for control of the motion capture system, and may include an LCD display 210 and a data input device 212, such as a keypad or keyboard, for instance. A data bank 213 is provided to microprocessor 202 and may include a memory, such as a circular memory buffer, which receives motion data from one or more IMMCAP modules 102, for storage and later retrieval and analysis. Also, a permanent memory 216, such as FLASH memory may be provided for storage of motion capture data, or for storage of predetermined or optimum motion data for analysis and/or comparison.

Figure 4:
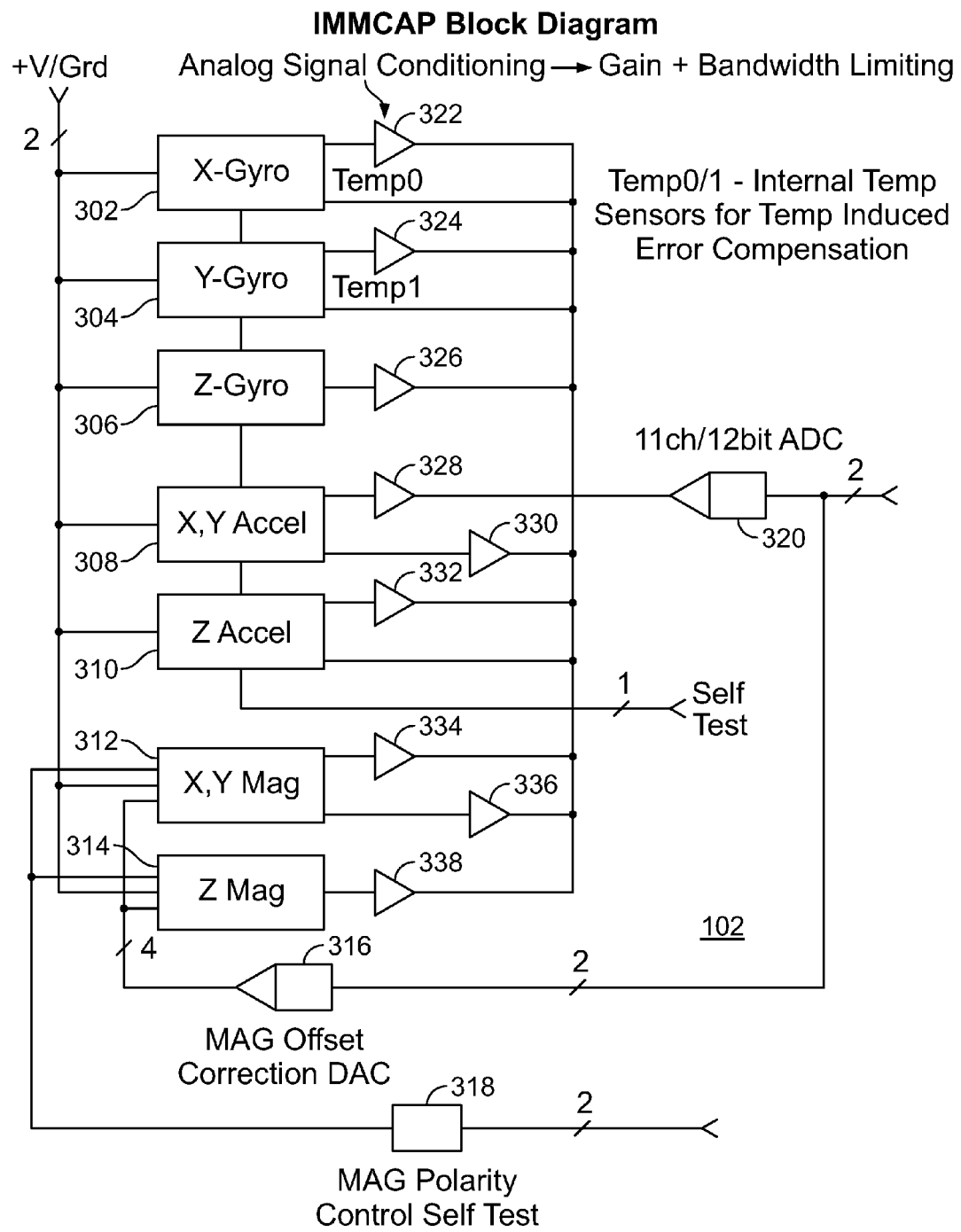
FIG. 4 is a block diagram of the inertial magnetic motion capturing sensor of the present invention showing gyroscopes, accelerometers, and magnetometers for the x, y and z axes, with the outputs of each sensor conditioned and sampled for use by the microprocessor as shown in FIGS. 1 and 2.

Module 102 is shown in FIG. 4 as a block diagram of the inertial magnetic motion capturing (IMMCAP) sensor of the present invention. Module 102 includes an orientation sensing gyroscope array, such as x-axis gyroscope 302, a y-axis gyroscope 304, a z-axis gyroscope 306. In addition, X, Y and Z axis accelerometers 308 and 310 are also provided. Magnetometers 312 and 314 for the X, Y and Z axes are also provided. The outputs of these sensors are conditioned with analog signal conditioning hardware 322, 324, 326, 328, 330, 332, 334, 336 and 338. The outputs of these signal conditioners are fed into an analog to digital converter 320 which in turn is routed to microprocessor 104 (as shown in FIGS. 1 and 2).

A magnetic offset correction digital to analog converter 316 may be provided, along with a magnetic polarity self test circuit 318 in order to minimize the effect of magnetic sensor and signal conditioning offset errors (dynamic magnetic fields) on the overall accuracy of the IMMCAP module.

Figure 5:
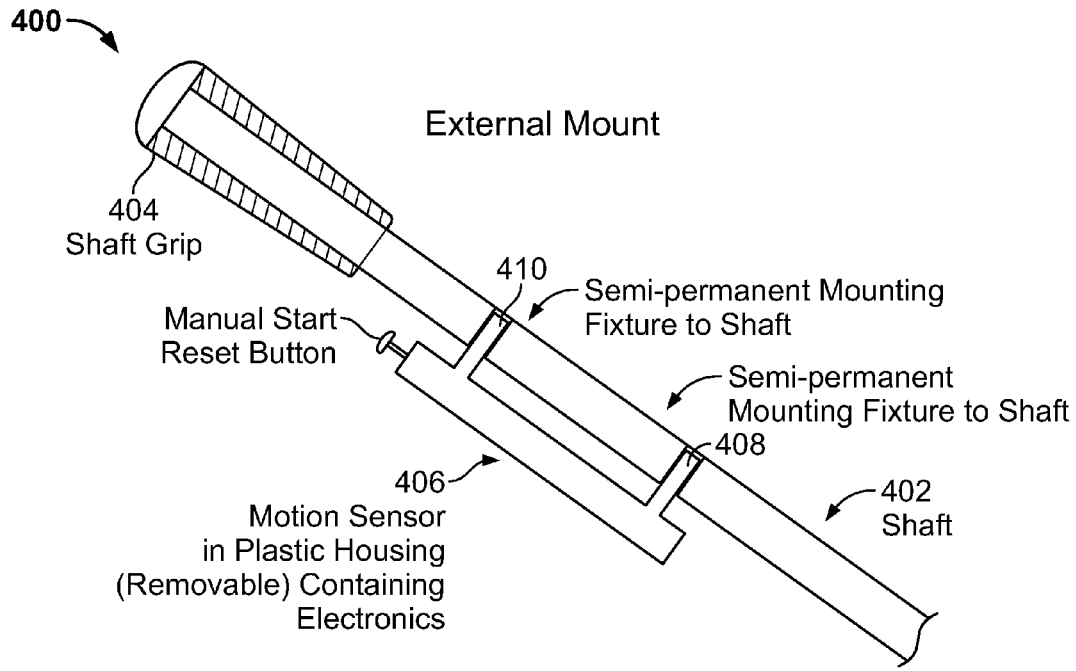
FIG. 5 is a exemplary embodiment of the motion capturing system of the present invention as embodied externally and parallel to the handle of the shaft of a golf club, for instance, as a removable attachment to be used during training periods.

As a preferred embodiment, FIG. 5 presents an exemplary embodiment of the motion capturing system of the present invention on a golf club, and generally designated 400. Motion capturing system 400 includes a shaft 402 having a shaft grip, or handle, 404 and a motion sensor 406 mounted alongside the handle 404 of the shaft 402 of a golf club. As shown, a pair of removable attachment clips 408 and 410 may be used during training periods to secure the motion sensor 406 to shaft 402. When training period is finished, the sensor 406 may be easily removed from shaft 402, thereby returning the club to its ordinary state.

Figure 6:
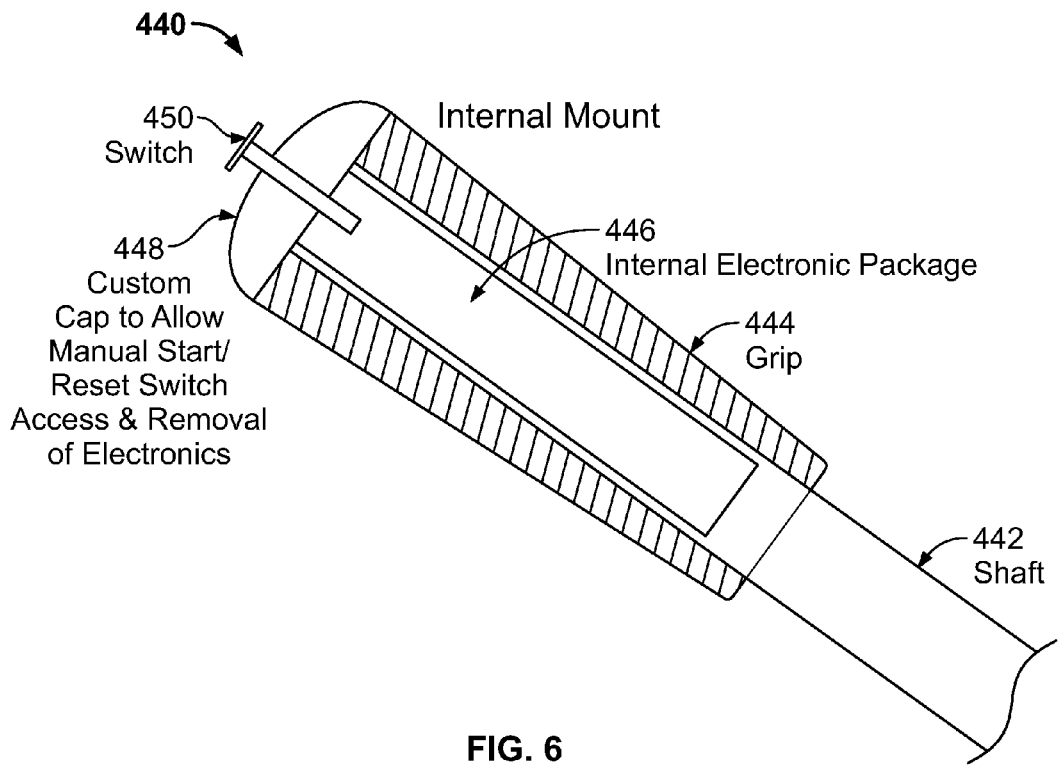
FIG. 6 is an exemplary embodiment of the motion capture system of the present invention as embodied internally to the handle of the shaft of a golf club, thereby providing a motion sensing club that may be used just as an ordinary club would be used with no noticeable change to the user of the club.

As an alternative embodiment, FIG. 6 depicts another exemplary embodiment of the motion capture system of the present invention generally designated 440. As shown, motion capture system 440 includes a shaft 442 formed with a grip 444. An internal IMMCAP module 446 is sized to be received within the shaft 442 through cap 448 and may be equipped with an ON-OFF switch 450. Because the module 446 is neatly concealed within the shaft 442, the use of the club is uninhibited thereby providing for a functionally equivalent club for practice and motion capturing purposes. This is particularly advantageous because the golfer, in this instance, may handle the club as if it were un-modified, thereby allowing the most accurate motion capturing to occur.

Figure 7:
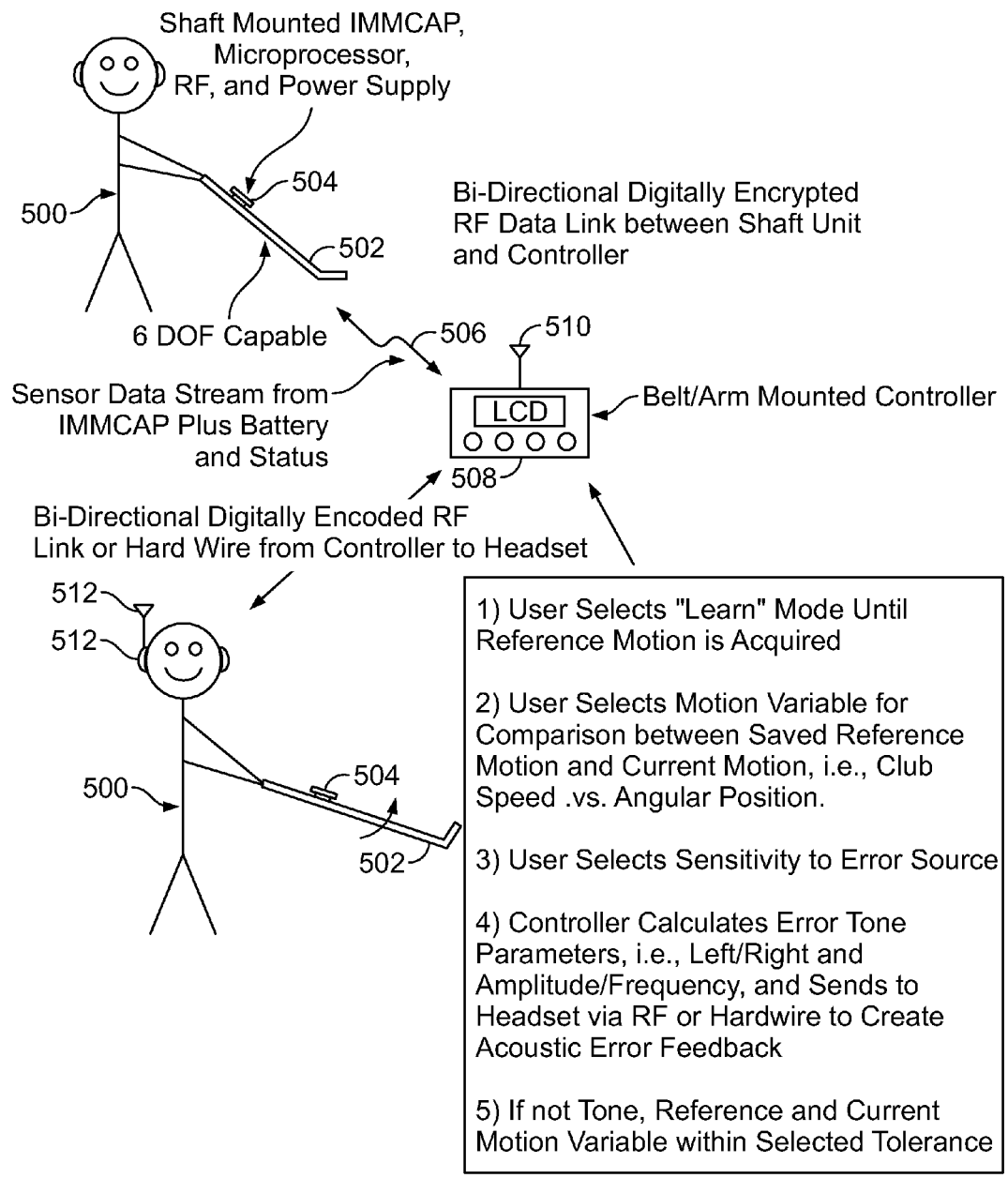
FIG. 7 is a diagrammatic representation of a golfer using the motion capture system depicted in FIG. 5, and used in conjunction with the sensor elements of FIG. 1 or 2 and 3, and showing the steps for use of the present invention in a training mode in which the user practices using the device until an optimum motion is performed at which time the system captures the optimum motion for comparison to future motions.

Referring now to FIG. 7, a diagrammatic representation of a golfer using the motion capture system depicted in FIG. 5 is shown. Specifically, golfer 500 is shown using a golf club 502 equipped with an IMMCAP module 504. Module 504 measures motion data from the club including the six degrees of freedom, and relays this information to controller 508 (either through a wired connection, or) through a wireless connection with antenna 510. This data is then displayed on the controller for the golfer 500, or it may be analyzed and compared to a known, or optimized motion.

It is to be appreciated that the motion capture system of the present invention may be used in conjunction with the sensor elements of FIG. 1 or 2 and 3. As shown in FIG. 7, a headset 512 may be provided to golfer 500 to provide an audible feedback signal. This feedback signal may be received via a hardwired or RF link from controller 508 based upon a motion data analysis and comparison to a known, optimized, or selected motion.

FIG. 7 also lists steps 1–5 for the use of the present invention in a training mode in which the user practices using the device until an optimum motion is performed at which time the system captures the optimum motion for comparison to future motions.

Figure 8:
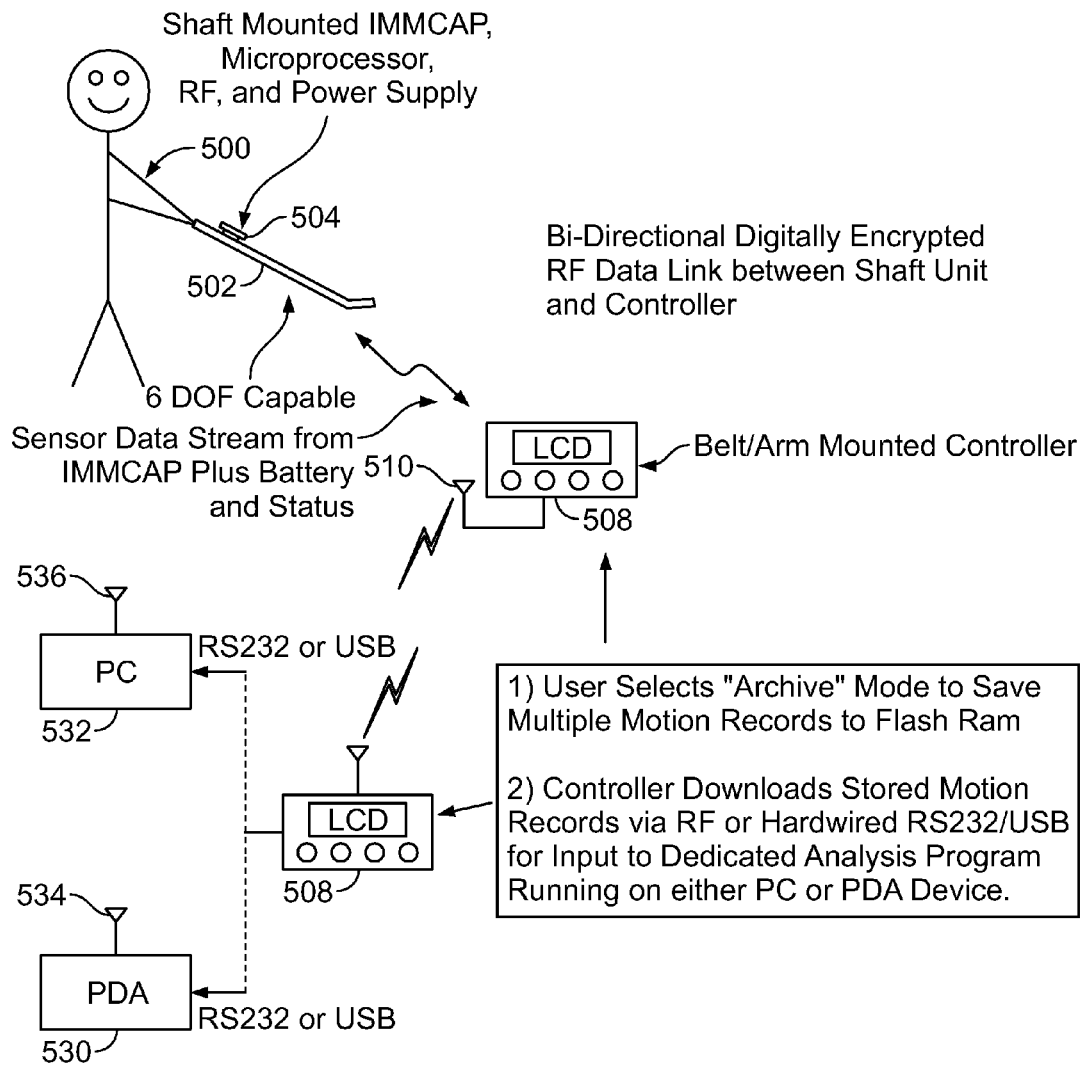
FIG. 8 is a diagrammatic representation of a golfer using the motion capture system of FIG. 7 to capture multiple motions of the motion sensor for subsequent motion analysis and comparison to known motions or other data analysis.

Referring now to FIG. 8, a diagrammatic representation of a golfer 500 using the motion capture system of FIG. 7 to capture multiple motions is shown. The motion sensor 504 is attached to club 502 while being moved by golfer 500 and motion data is captured and transmitted via RF signal to antenna 510 of controller 508. This motion data is received and stored for subsequent motion analysis and comparison to known motions or other data analysis. As shown, this motion data may be transmitted from controller 508 to a PDA 530 or PC computer 532 through antennae 534 and 536, respectively.

The motion data that is received by controller 508 may be stored for future retrieval, or may be analyzed in real time to provide the golfer SOD real-time feedback as to the errors in his motion, or deviations in his motion from a known, desired or optimal, motion. Also shown in FIG. 8 are the steps 1–2 for archiving motion data captured from module 504. This data may also be transmitted from controller 508 to PDA 530 and PC 532 via a wired interface as shown in dashed lines, such as an RS232 or USB interface.

Figure 9:
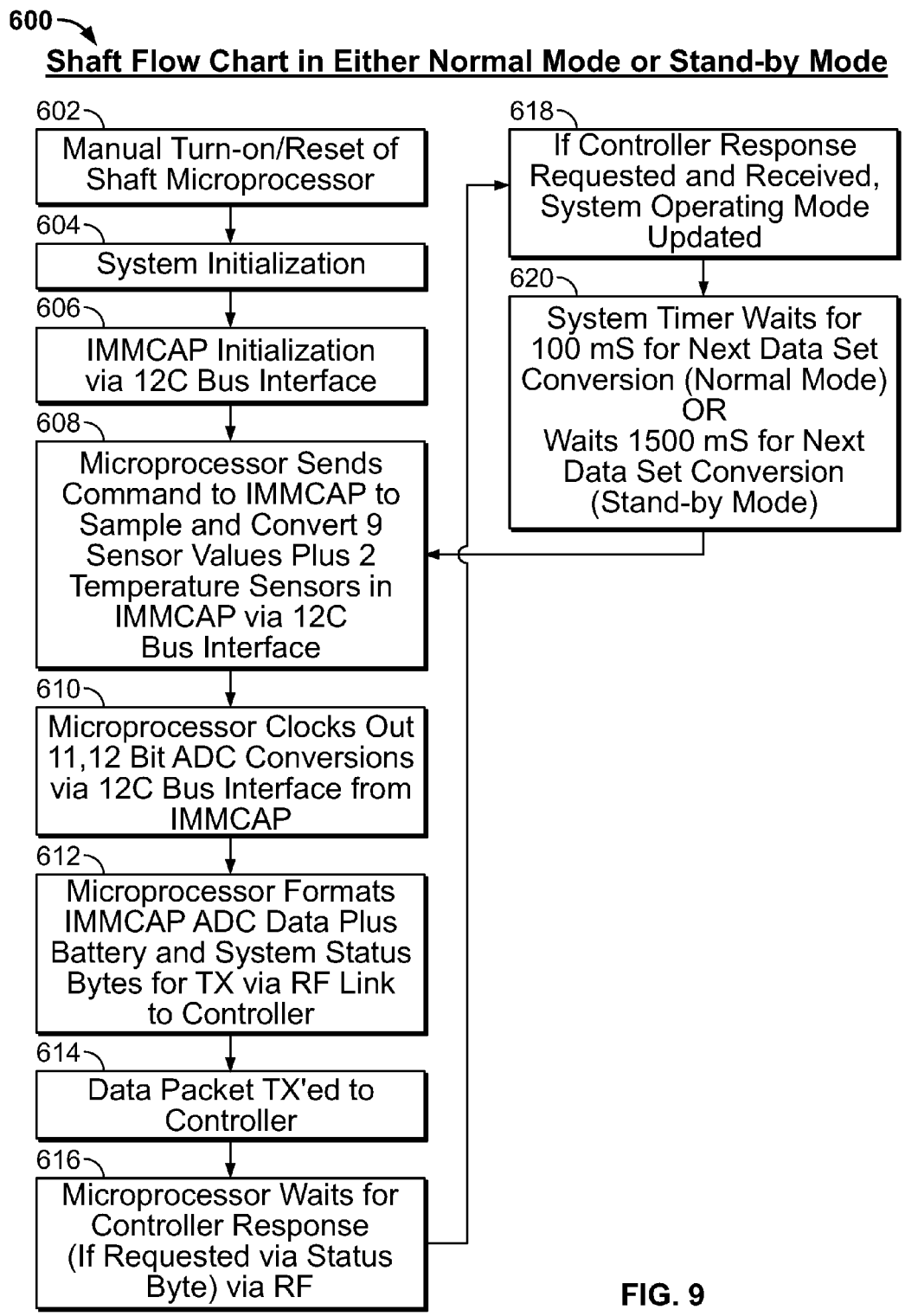
FIG. 9 is a flow chart representation of the "Normal Mode" of operation of the motion capture system of the present invention beginning with the initialization of the shaft microprocessor, initialization of the motion data controller and progression to data acquisition mode, or to standby mode.

FIG. 9 is a flow chart 600, representing the "Normal Mode" of operation of the motion capture system of the present invention. The flow chart begins in step 602 with the manual turning on of the shaft microprocessor. Once on, in step 604, the initialization of the shaft microprocessor begins, followed by initialization of the IMMCAP module in step 606. Once on and stable, the microprocessor sends a command to the IMMCAP module in step 608 to begin sampling IMMCAP data, temperature data, and other sensor data for a self-check of the system.

Once the self check is completed, in step 610, the microprocessor begins clocking the sensor data for conversion by the ADC converter in step 612. Once sampled, the motion data is transmitted to the controller in step 614. If an operating mode update is requested by the shaft processor, once every 10 transmissions, in 504, a response is received in step 616, and the operating mode is updated in step 618. If the system is in the normal mode, data sampling continues at 100 ms intervals as shown in step 620, otherwise, the system is placed in a low power stand-by mode with a low speed sample rate of 1500 milliseconds, with control returning to step 608 where the system re-checks the IMMCAP data outputs at the 1500 millisecond sample rate.

Figure 10:
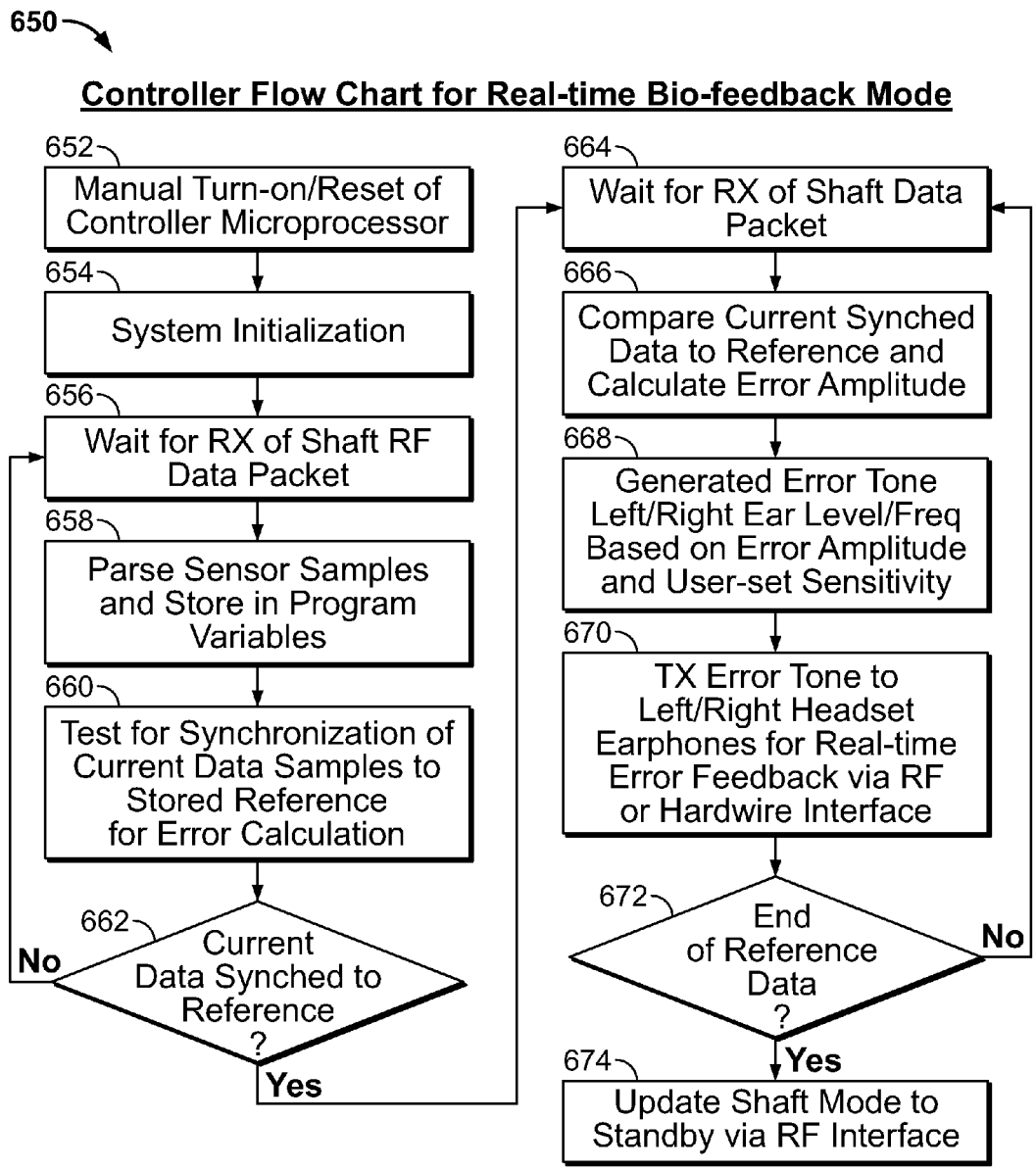
FIG. 10 is a flow chart representation of the "Real Time" data acquisition mode of the motion capture system of the present invention showing the acquisition of motion data and comparison to stored motion data in order to provide a real-time feedback signal to the user, and relaying this real-time motion data to the controller for subsequent analysis or comparison to known motion data.

Referring to FIG. 10, a flow chart representation of the "Real Time" data acquisition mode of the motion capture system of the present invention is shown and generally designated 650. Process 650 begins with step 652 with a manual turn-on of the controller and microprocessor, and continues with system initialization in step 654. Once initialized, the system awaits receipt of the shaft motion data, such as an RF data packet, in step 656.

Once the data packet is received in step 656, the data is analyzed and parsed for establishing sensor-related program variables to be used in the subsequent analysis of motion data. In order to provide real-time feedback in this mode, the real-time sensor data stream must be time synchronized with the stored reference motion file. Once synchronization is achieved in 660 and verified in 662, the processor now receives time synchronized real-time data from the motion sensors.

As real-time data is received from motion sensors, the known time synchronized motion data is synchronized and compared to reference data and a motion error is calculated in step 666. The amplitude of this error signal from step 666 may be greater than a predetermined error amplitude, thereby providing an error signal, such as an audible error tone, in step 668. This error signal may be transmitted to a user's headset via an RE link or hardwired to provide immediate and specific error information regarding the current motion or motions. The error feedback may be terminated following the end of the reference data in step 672, and the system may reset itself in step 674 to await the next motion sequence.

In a preferred embodiment of the system of the present invention, the acquisition of motion data and comparison to stored motion data may be accomplished in real time, thereby giving immediate feedback to the user. Alternatively, this data may be captured and analyzed later in a post-processing analysis.

Figure 11:
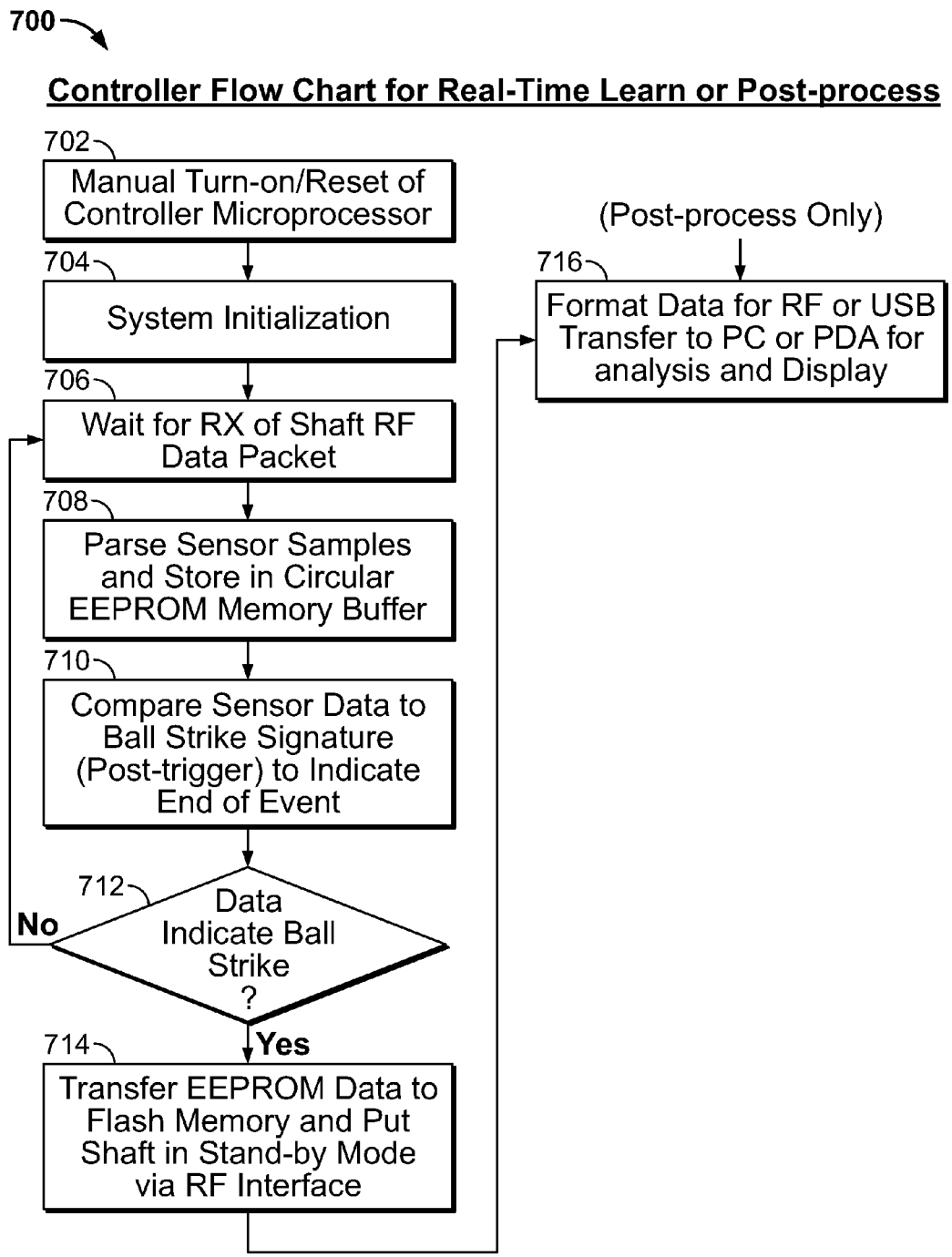
FIG. 11 is a flow chart representation of the "Post Processing" data acquisition mode of the motion capture system of the present invention showing the capturing of motion data in a circular buffer until an event trigger is sensed, resulting in the cessation of the motion data capturing and formatting of the data for transmission to a PC or PDA for subsequent analysis.

For example, FIG. 11 includes a flow chart representation of the "Post Processing" data acquisition mode and is generally designated 700. Process 700 begins with step 702 in which the controller is manually turned on, and the system is initialized in step 704. Once initialized, the controller awaits receipt of an RF data packet from the shaft module in step 706. The data from the shaft module is then analyzed and parsed and stored in a circular buffer in step 708.

The motion file capture is terminated by the detection of a pre-determined data signature of a ball strike, indicating the end-of-record for the particular event in step 710. If no trigger event occurred, the process returns to step 706 to await the next data packet to be stored in the sequential circular buffer. On the other hand, if the trigger event occurred, motion data is transferred from the EEPROM data to flash memory in step 714 for more permanent storage for later analysis.

The motion capture system of the present invention may provide the motion data in EEPROM for exchange via RF or USB transfer to a PC or PDA for analysis and perhaps graphical display in step 716 to further assist the golfer in his quest for a perfect swing.

Figures 12, 13:
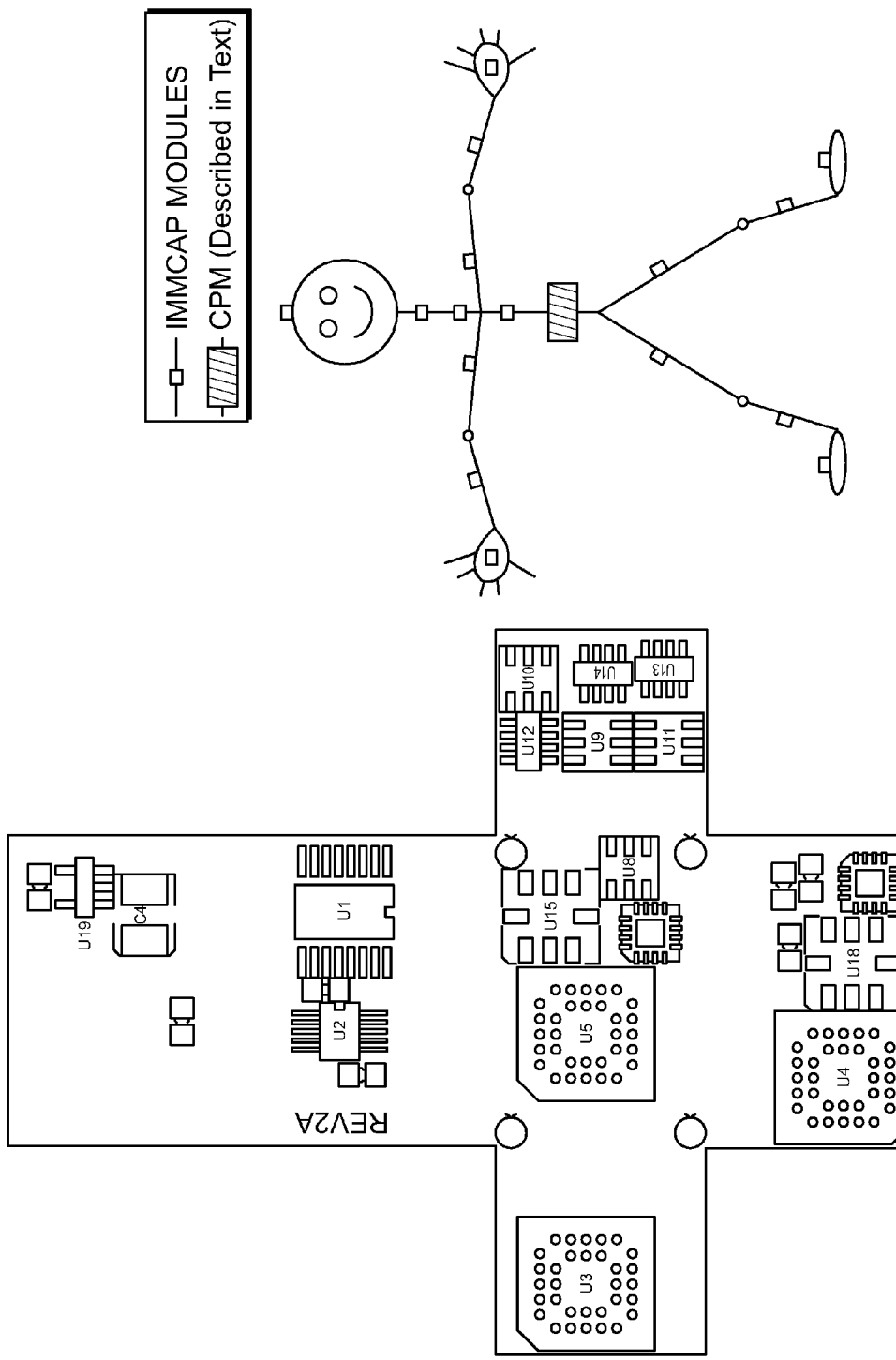
FIG. 12 is a block diagram showing the component location and relative construction for an exemplary inertial magnetic motion capture (IMMCAP) module as used in the present invention.
FIG. 13 is a multiple IMMCAP module system on a human body, with 3 modules per limb plus 4 for the spin/head resulting in a total of 16 modules, through which the entire skeletal motion can be capture for gait analysis, special effects, or sport training applications

Referring now to FIG. 12, a block diagram showing the component location and relative construction for an exemplary inertial magnetic motion capture (IMMCAP) module as used in the present invention is shown and generally designated 900. IMMCAP module 900 may include three magnetometers 902, 904 and 906, three accelerometers 908, 910, and 912, and three gyroscopes 914, 916 and 918. It will be further discussed below that in certain circumstances, the inclusion of gyroscopes 914, 916 and 918 to the present invention may be unnecessary.

In a preferred embodiment, module 900 may be formed on a flexible circuit board thereby providing for the manufacturing of the module in a flat, planar configuration, with the sides of the module being formed into a cube after assembly. This will significantly simplify the manufacturing costs and minimize manufacturing challenges that would result from a multi-circuit board cube assembled to form the required 3D, orthogonal orientation of the X, Y, Z axis sensors. This is not to suggest, however, that the multi-circuit board cube is not a suitable solution to the challenges solved by the present invention. As future integration technology will allow all three orthogonal axes to be included on a single IC package, the 3D printed circuit board requirements for the present embodiment will become relaxed.

A MEMS Sensor Based Full-Body Motion Capture System

As an alternative embodiment of the present invention, a highly miniaturized electronic data acquisition system is contemplated and capable of measuring and recording the spatial orientation and translation, 6 degrees of freedom (DOE), of each independent body segment through 3D space in real-time. Knowing the 6 DOF of each body segment together with the known relation of the body segments, a reconstruction of the entire body motion in 3D space via a computer generated representation of the subject under study is possible. The potential application of such a system range from sports rehab motion analysis to movie special effects and animation.

The system incorporates multiple IMMCAP modules as described in FIG. 1. The IMMCAP modules will be networked to a single control processor module (CPM) that will coordinate, process, and store the data output from the IMU array for immediate transfer via RF/IR link or for later download and analysis as described in FIG. 2. The IMMCAP/CPM module array will be integrated into a highly compliant body-suit with each IMMCAP module assigned and mounted to a rigid body segment, i.e. head, upper arm, forearm, etc., requiring a single CPM module and approximately 16-20 IMMCAP modules to monitor the entire set of body axes.

FIG. 2 represents the block diagram of the system design. The single CPM module is located in the general area of the lower back with each of the 16–20 IMMCAP modules secured to their respective body segment. The system is networked via a one wire half duplex, or two wire full duplex, local area network (LAN) embedded into the body-suit. The CPM module will provide power, by additional wires, and communication control for all IMMCAPs via the LAN.

The block diagram of the CPM module is shown as part of FIG. 2. The figure illustrates the subsystems incorporated into the CPM modules consisting of:
1) Battery Pack
2) DC-DC converter
3) Microprocessor
4) Non-volatile memory
5) RF/IR/hardwire full/half duplex serial data link (optional)

The battery pack consists of 1 to 3 primary or secondary cells to provide system power. The DC-DC converter provides the operating DC voltage to operate the CPM module and provides the distributed power to the IMMCAP modules via the communication/power LAN. The microprocessor in the CPM runs the control software to synchronize the data acquisition and transfer from the IMMCAP modules to the CPM. Additionally, the processor formats the data for local storage in non-volatile memory and immediate or delayed data downloading via the hard wire connection or RF/IR data link. The CMP components are selected for low power operation to effect maximum operating time for a given battery capacity.

The block diagram of the IMMCAP modules is shown in FIG. 4. The figure illustrates the subsystems incorporated into the IMMCAP modules consisting of:
1) Tri-axial MEMS accelerometer
2) Tri-axial MEMS rate sensor (gyroscope)
3) Tri-axial MEMS magnetometer
4) Temperature sensor
5) Micro-controller
6) Analog to Digital converter (ADC)
7) Digital to Analog converter (DAC)
8) Analog signal conditioning electronics for all 9 MEMS sensors The tri-axial accelerometer and rate sensor comprise a classic inertial measurement unit (IMU) capable of determining the change in spatial orientation (rho, theta, phi) and linear translation (x, y, z) relative to a fixed external coordinate system. The addition of the tri-axial magnetometer provides the capability to determine the absolute orientation of the IMU, and the corresponding body axis, relative to magnetic north to provide an absolute orientation. Additionally, the magnetometer acts as a backup rate sensor in case the rate sensors saturate due to excessive rates of rotation.

Each of the nine MEMS sensors generates an analog voltage that must be amplified, filtered, and offset corrected under control of the local micro-controller via the ADC, DAC, and analog signal processing. Additionally the micro-controller also interfaces with the CPM module via the LAN to execute commands issued by the CPM and for data transfer to the CPM. Finally, the DC-DC converter and voltage regulator, located in the support electronics, provide the stable power supply voltages needed by the analog and digital elements of the IMMCAP from the DC voltage supply associated with the LAN.

Inertial-Magnetic Motion Capture (IMMCAP) Sensor Array for Single and Multiple Axes Motion Capture Applications 1) General Description and Applications.

As another alternative embodiment of the present invention, a highly miniaturized, wireless electronic data acquisition system is disclosed and is capable of measuring and recording the spatial orientation and translation, 6 degrees of freedom (DOF), of single and multiple rigid axes through 3D space in real-time. Additionally, the initial spatial orientation can also be determined referenced to the earths' terrestrial gravity and magnetic fields.

Although an IMMCAP based motion capture system is applicable to almost any sports activity, gait/motion analysis, motion picture special effects, or virtual reality application, the IMMCAP system will be described within the context of golf swing application for the sake of this discussion.

The golf industry application of the IMMCAP technology ranges from the real-rime capture of the motion of a golf swing for analysis, biofeedback training, or club fitting to the capture of the entire body motion using multiple IMMCAP sensors. The primary advantage of an IMMCAP enabled system, in addition to the extremely high degree of accuracy provided, is that the motion capture process does NOT require the golfer to be placed in an unnatural environment. An IMMCAP system allows the golfer to practice/play in a normal situation of his/her choice, i.e. golf course, practice putting green, or driving range, without restriction. By allowing the swing/motion to be performed under natural and varying conditions, a more representative and realistic sense of the swing dynamics will be measured.

Current video based systems require the golfer to be placed in an "unnatural" studio environment to allow multiple cameras to view the swing path within a highly restricted spatial volume. Similarly, large stationary swing analysis systems require the golfer to be "tethered" to the system at a single point.

The IMMCAP sensor array module is comprised of multiple, highly miniaturized MEMS (Micro Electro Mechanical System) sensor elements that allow the 3D motion of the sensor, and thus the rigid body which it is attached, to be captured and recorded in real-time. The IMMCAP sensor can be integrated into a complete system depending on the application.

What follows is a brief description of unique applications of the IMMCAP module for use within the golf industry.

Putting Trainer and Swing Analysis:

This system is designed to capture the complete swing dynamics of a golf swing and provide real-time acoustic feedback to allow a golfer to practice a particular swing path to create the required "muscle memory" of the desired stroke. Prior to beginning the practice session, a previously saved reference swing path is used to compare the current swing path in real-time. This reference swing can be determined and saved by the golfer or by a coach to be used in the current training session and recalled at a later time to become the reference swing if desired. As the golfer practices the swing path, the current swing path is compared to the reference. If the current swing path deviates from the reference path, an acoustic tone is generated at the instant the path diverges from the reference with the tone increasing in intensity as the swing error becomes larger. If the golfer can execute the swing WITHOUT generating any tone, the current swing path is identical to the reference. The following swing parameters can be used as the training target OR used in any combination:
a) tempo
b) swing path
c) face angle
d) heel-toe angle
e) loft angle
f) aim point System sensitivity is adjustable to allow the golfer to modify the gross errors in the swing consistency then increasing the sensitivity as he/she improves. Ultimately the golfer should be able to consistently execute the swing without the need for the acoustic feedback once the muscle memory has been reinforced.

An alternative to the acoustic tone feedback directly to the golfer is a graphical error representation on a hand-held device, Palm Pilot or PDA, used in the context of a coaching environment. Swing improvements based on the analysis of the current swing path can be entered by the coach for the student to execute without the need for the coach to be physically present once the new swing "reference" has been downloaded to the system via a wireless link. This wireless link also enables the system to be Internet enabled allowing data to be up/down loaded from a pay-per-use or fee based training website.

The system of the present invention is a three to four piece system which may, depending on the configuration, consist of the following:
1) Shaft mounted wireless appliance incorporating an IMMCAP module.
2) Belt mounted wireless control/display/digital signal processing (DSP)
3) Wireless headset for error tone generation/acoustic bio-feedback
4) Optional wireless PDA software application for coaching input and swing modification.

The shaft mounted appliance containing the IMMCAP plus associated support electronics, i.e. power supply, wireless data link, microprocessor, is the size of an AA battery and weights approximately 10 grams. Once in mass production, all the system components, particularly the shaft mounted sub-system, can be greatly miniaturized over the already small current size/weight.

This system is capable of being applied to any type of golf club/swing training application, i.e. irons and woods, but the acoustic feedback feature would not be appropriate due to the fast swing dynamics. A visual feedback system using the aforementioned PDA display would be utilized by the golfer and/or coach.

Club Fitting:

The current state of club fitting is quite primitive due to the lack of any consistent swing dynamics measurement capability in an ordinary pro-shop. An IMMCAP based system has been developed that can be installed INSIDE a club shaft near the top of the shaft. The system is designed to record the 3D dynamics of up to hundreds of club swings while the golfer uses the club in the normal fashion, i.e. either a normal round of golf or at a driving/putting range.

By recording a large number of swing events representing the golf swing in a varied environment and conditions, a better estimate of the golfers' average performance can be determined. This information will allow a club fit that best serves the golfer over the entire game instead of depending on a single swing set in an unnatural environment to determine the proper club fit. The current system allows the stroke data to be downloaded to an application software package running on the pro-shop computer or to be downloaded via the Internet for analysis and fit recommendations from a remote site. This capability also allows the test club to be sent to a prospective client not near a pro-shop for remote fitting.

Currently the present invention may be placed within the shaft but could be configured as an external device attached to the external shaft.

Full Body Motion Analysis:

In addition to the 3D club motion dynamics, an entire body suit incorporating multiple IMMCAP modules allow the entire body motion to be captured for analysis. By looking at the entire body/club system with the detail offered by the IMMCAP modules, Golf body mechanics training can be redefined.

Theory of Operation

The basic IMMCAP module consisting of the following sub-systems designed onto a unique highly miniaturized 3D printed circuit board (PCB):
1) Tri-axial MEMS accelerometer
2) Tri-axial MEMS rate sensor (gyroscope)
3) Tri-axial MEMS magnetometer
4) Temperature sensor
5) Analog to Digital converter (ADC)
6) Digital to Analog converter (DAC)
7) Analog signal conditioning electronics for all 9 MEMS sensors The tri-axial accelerometer and rate sensor comprise a classic inertial measurement unit capable of determining the change in spatial orientation (rho, theta, phi) and linear translation (x, y, z) relative to a fixed external coordinate system.

The addition of the tri-axial magnetometer, used in conjunction with the tri-axial accelerometer, provides the capability to determine the absolute orientation of the IMMCAP, and the corresponding axis, relative to the local 1 g gravity vector and the local magnetic vector. Additionally, the magnetometer acts as a back-up rate sensor in case the rate sensors saturate due to excessive rates of rotation. Finally, the embedded temperature sensor allow for temperature induced drift compensation in both real-time and post-processing.

The IMMCAP module is designed to operate under direct control of a dedicated, local micro-processor (uP). Each of the nine MEMS sensors generates an analog voltage that must be amplified, filtered, and offset corrected under the control of the local uP via the ADC, DAC, and analog signal processing contained within the IMMCAP.

In addition to the control of the IMMCAP functions, the local uP also formats the data stream generated by the IMMCAP for transmission via a dedicated radio frequency (RF) digital data link. Finally, a DC-DC converter and voltage regulator provide the stable power supply voltages needed by the analog and digital elements of the IMMCAP and uP from a single primary or secondary battery cell.

Depending on the specific IMMCAP application, the associated support electronics will vary. In an application which is designed to capture the 6 DOF of a single rigid body, i.e., golf shaft, tennis racket, baseball bat, a common format will most likely be incorporate. A low mass appliance attached to the rigid body may consist of the following:
1) basic IMMCAP module
2) uP
3) Rf data link
4) DC-DC converter/battery In some embodiments, the IMMCAP module will be an independent subsystem from the rest of the support electronics in the appliance, and in others the essential components of the IMMCAP module will be integrated into a single system with the support electronics.

The digital RF data stream from the appliance will be transmitted via a short range ISM band transceiver to an associated electronics package designed to process the data stream for the specific application. An example, but not limited to, would be an acoustic bio-feedback system as described above.

Inertial-Magnetic MEMS Based Sensor System for Single and Multiple Segment Motion Capture Systems A highly miniaturized multi-sensor module of the present invention consists of inertial and magnetic sensor sub-systems capable of sensing the absolute orientation and motion of a rigid body relative to an external reference coordinate system in-situ.

The intended application for this sensor system is to capture the real-time absolute motion of a single rigid body, i.e. golf shaft or baseball bat, or multiple rigid bodies, i.e. multiple human body segments, for immediate of post-event analysis and display.

Current motion capture systems fall into two distinct groups. The $1^{st}$ relies on multiple spatially calibrated cameras to record the motion of reference points on one or more rigid bodies of interest onto video tape for post-processing. This video post-processing is capable of extracting a subset of the six degrees of freedom, (DOF) but not all. An example of a non-observable DOF would be the rotation of the lower arm segment about the long axis or rotation of a golf club about the shaft axis The $2^{nd}$ type incorporates a local, 3 meters or less, pulsed magnetic "beacon" with magnetic sensors attached to the rigid bodies. Although this system can extract all 6 DOF, the magnetic sensors and supporting electronics/cables are quite large lending itself more to real-time motion animation then motion capture.

The Inertial-Magnetic Motion Capture system (IMMCAP) described here is unique to both of the aforementioned systems in that it uses conventional inertial motion measurement concepts in conjunction with both the earth gravity and magnetic fields to describe the 6 DOF of single or multiple rigid bodies relative to an external frame of reference.

Conventional inertial measurement units (IMU) incorporate three axes of orthogonal accelerometers and three axes of gyroscope to fully sense the 6 DOF. The IMU outputs the linear translations, X, Y, and Z motion in space, as well as the three rotation angles, roll, pitch, and yaw. Unfortunately, theses 6 DOF are relative to a PRE-KNOWN initial starting position/orientation and cannot yield an absolute position/orientation other then referenced to the initial position.

In the IMMCAP system, this problem is partially overcome by utilizing the outputs of the three axis accelerometer together with three additional axes of magnetometer. If the rigid body is known to be motionless, for as little as 1 msec, this sensor combination acts as an orientation sensor yielding an absolute orientation of the rigid body relative to the earth gravity/magnetic field. These fields have a stable and known orientation relative to each other as well as to any arbitrary external frame of reference. With this initial orientation known, the absolute orientation can be determined via the IMU. As the initial orientation is usually adequate for motion capture, the absolute initial translation can also be obtained by placing the single or multiple IMMCAP modules at know absolute X, Y, Z positions relative to an external reference to obtain absolute position and orientation.

The typical IMMCAP module is comprised of the following sub-systems:
1) tri-axial MEMS accelerometer
2) tri-axial MEMS gyroscope
3) tri-axial MEMS magnetometer
4) temperature sensor
5) analog signal conditioning for MEMS sensor array
6) analog to digital converter (ADC) for MEMS output
7) analog voltage conditioning
8) RF interface for data/control input/output (optional if external)
9) embedded micro-processor (optional if external)
10) micro battery (optional if external)

The IMMCAP module, comprising sub-systems 1–6, has been produced with off the shelf components in a package size of 0.7" (18 mm)×0.3" (8 mm)×0.4" (10 mm). The modules can be significantly reduced in size via the use of application specific integrated circuits (ASIC) and/or die level multi-chip modules (MCM).

Two exemplary embodiments of the present invention are described below with many obvious derivatives also possible and fully contemplated without departing from the spirit of the present invention.

Golf Swing Motion Capture.

By integrating the IMMCAP module with sub-systems 7–9, a self powered, wireless single axis motion capture unit can be realized for a golf club shaft. Due to extreme small size and weight possible utilizing the MEMS sensor technology, the motion capture unit can be directly attached to the golf shaft, just under the grip area to minimize the rotating mass. An appropriate sample rate of the sensor signals will be based on the Nyquist criteria and the frequency content of the action to be measured. The scanned sensor outputs will be digitized and transmitted via an RF interface to an external electronic unit used either for real-time bio-feedback muscle training purposes and/or to be stored for post-analysis. By storing an absolute or relative stroke reference in computer memory, each stroke event can be compared to the reference to detect deviations in the following relative to the reference:
1) initial face angle
2) face angle as a function of time or back stroke angle
3) toe-heel angle as a function of time or back stroke angle
4) head speed as a function of time or back stroke angle
5) loft angle at the point of ball impact
6) entire 6 DOF stroke dynamics from stroke start to ball strike This information can be utilized in real-time as a bio-feedback signal for muscle memory and/or for post analysis of the event.

Full Body Motion Capture.

By attaching multiple IMMCAP modules onto the human body, 3 modules per limb plus 4 for the spin/head resulting in a total of 16 modules, the entire skeletal motion can be capture for gait analysis, special effects, or sport training applications. Each IMMCAP module would be coupled to an "intelligent node" integrated into a highly flexible body suit. The 16 nodes would be networked to a central control unit via an embedded four wire power/data bus also integrated into the body suit. The central control unit would provide synchronization, power, and external interface for the IMMCAP data stream.

The data collected in this system may be telemetry-linked to a base station capable of receiving the motion capture data for in-situ evaluation, post measurement analysis, or a combination of both in-situ and post measurement analysis. This telemetry may be through RF transceivers as described above, or through optical transmission such as through an infrared data link, as is known in the art.

High Rate Applications

By utilizing both the MEMS gyro and the magnetometer for body rotation detection, the shortcomings of each sensor can be partially or totally compensated.

Gyro Limitations for the Determination of Angular Rotation:

All solid state gyros generate a voltage output that is proportional to the rotational velocity ω in mV/degrees/sec. This requires that the total rotation about an axis from a time t=0 to t=T be obtained by integrating the gyro signal such that $$\Theta(T) = \int_0^T \omega_{gyro}(t)dt \qquad (1)$$

The $\omega_{gyro}(t)$ signal is comprised of the following superimposed signals shown as $$\omega\omega_{gyro}(t)=(\omega_{signal}(t)\pm\omega_{noise}(t))+(\omega_o\pm\omega_{oerror}) \qquad (2)$$

where $\omega_{signal}(t)$ is the true signal generated in response to the rotation, $\omega_{noise}(t)$ is the random component of the signal due to the presence of in-band random noise present in all linear signals, $\omega_o$ is the zero rotation value from the sensor, and $\omega_{oerror}$ represents the instantaneous value of $\omega_{noise}(t)$ at t=0 when $\omega_o$ was determined. Rearranging (2) to represent the actual signal due to rotation yields $$_{signal}(t)=(\omega_{gyro}(t)-\omega_o\pm\omega_{oerror}(t=0))\pm\omega_{noise}(t) \qquad (3)$$

substituting (3) into (1) and assuming the $\omega_{noise}(t)$ will integrate to zero yielding the simple result $$\Theta_{calc}(T)=\Theta_{actual}(T)\pm T\omega_{oerror}(t=0) \qquad (4)$$

The above implies that the uncertainty in the calculated rotation as measured by the gyro increases with time which limits the useful time the sensor output is usable based on a desired angular accuracy. The $\omega_{oerror}$ value can be reduced by limiting the signal bandwidth and by averaging multiple measurements of $\omega_o$ over some time interval when the rotation is known to be zero but this averaging time is limited due to practical application.

The second and more serious Limitation of the current generation of MEMS gyros is the limited sensor dynamic range. Currently, the practical upper limit for MEMS gyros is of the order of 1200 o/sec which is insufficient for some motion capture applications, i.e. the instantaneous angular velocity of the lower arm of a baseball pitcher will easily exceed this limit under some circumstances. This upper limit can be further increased by special electronic means but with an associated reduction of the low rate sensitivity due to the limited dynamic range of the MEMS gyro.

In summary, it is to be appreciated that MEMS and gyroscope limitations can be overcome by using the magnetometer as the primary rate sensor with the gyros taking the role of an ancillary rate sensor channel.

Magnetometer Based Angular Rate Sensor

In one embodiment of the present invention, there is an application using just the tri-axial accelerometer and tri-axial magnetometer without the need for the tri-axial gyros. More specifically, if it is assumed that the local magnetic field is constant over the extent of the spatial volume, the magnetometer can act as a differential gyro. This allows the mag/accel combo to act like a standard accel/gyro inertial sensor in addition to the combo providing the initial start orientation. The only caveat is there is a singularity when the magnetic field is coaxial with one of the mag axes resulting in no magnetic component in the plane normal to the axes. This may not be a problem in most applications and can greatly reduce cost, size and power requirements but eliminating the 3 relatively large gyros.

The IMMCAP magnetometer is primarily used in conjunction with the accelerometers to determine the initial spatial orientation of the body in space. If it is known that the body is not accelerating in any axis, the accelerometer becomes a gravitometer allowing the body orientation to be determined relative to the earth gravity field. The magnetometer determines the body orientation relative to the earth magnetic field. Combining this information allows determination of the absolute spatial orientation relative to the two external fields. Importantly, it must be assumed that there is no ferromagnetic material local to the magnetometer to avoid field distortion and subsequent orientation errors.

In addition to the above role, the magnetometer can act as a differential rate sensor in all three axes. The rotation about the Z axis can be deduced by observing the rotation of the magnetic field vector in the X-Y plane. In a time sampled system, as is the IMMCAP application, the angle of the $B_{xy}$ magnetic field vector is determined for the Nth sample as $$\Theta_{ZN} = \tan^{-1}(B_{XN}/B_{YN}) \quad (5)$$

where $\Theta_{ZN}$ is the angle of the $B_{XY}$ vector component relative to the X axis.

The next sample yields $$\Theta_{Z(N+1)} = \tan^{-1}(B_{X(N+1)}/B_{Y(N+1)}) \quad (6)$$

the angular velocity about the Z axis is determined by the following $$\omega_Z = (\Theta_{Z(N+1)} - \Theta_{ZN})/T_{sample} \quad (7)$$

where $\omega_Z$ represents the average angular velocity over the time from sample N to N+1. Of course, $\omega_X$ and $\omega_Y$ are found in a similar way. Again due to system noise the actual angular velocity will be represented as $$\omega_N = \omega_{Ncalc} \pm \omega_{Nnoise} \quad (8)$$

To determine the total rotation about an axis, the signal is integrated over a time T resulting in $$\Theta(T) = T(\Sigma\omega_n \pm \Sigma\omega_{Nnoise}) \quad (9)$$

Due to the noise being random and averages to zero, the above results in $$\Theta(T) = \Sigma\omega_n \quad (10)$$

A very important result is the lack of an integrated error term as found in eqn. (10) due to the magnetometer representing the rotational velocity as a rate of change, or differential signal, unlike the gyro.

This implies that the magnetometer rate sensor can be used indefinitely without Loss of accuracy. Equally important, there are no dynamic range issues associated with using magnetometers as rotation rate sensors unlike the gyro. The dynamic range of the magnetometer rate sensor is determined by the sensor bandwidth, rate of change from sample N to N+1, unlike the gyro which is related to the sensor gain. The usable bandwidth of the magnetometer is in excess of 25 Mhz, which equates to a ridiculously high rotation rate never to be experienced by a human body segment.

There are two downsides with the magnetometer rate sensor. The 1$^{st}$ is a mathematical singularity. If the external earth magnetic field is aligned with any of the sensor axes, the rotation rate about that axis cannot be determined. As an example, if the earth field is aligned with the Z axis, there is no magnetic field component projected onto the X-Y plane obviously precluding the calculation of the arc tan.

This can be dealt with in two ways. It is a simple task to determine if indeed the singularity exists, i.e. X and Y components measure to be zero. If so determined, the 1$^{st}$ solution is to revert to the MEMS gyro for Z axis angular rotation data, IF it is available AND the rotation rate does not exceed the dynamic range of the sensor as previously discussed. Since the gyro data will be used for a short time, i.e. until the singularity is gone, the aforementioned error accumulation due to $\omega_{oerror}$ will be negligible.

The 2$^{nd}$ solution is to extrapolate thru the singularity by keeping N previous samples in a FIFO buffer. If the singularity is determined to exist, the N samples can be used as input to a medium to high order polynomial to estimate the lost data until the singularity is gone. This is reasonable given the unlikely probability the singularity will exist for more then a few sequential samples given the dynamic nature of the motion.

A 2$^{nd}$ possible problem associated with the magnetometer rate sensor is the sensitivity to external field distortions. If the field distortions cause an unequal change in the two vector components, i.e. if the X and Y vector components are not changed by the same fraction via the distortion source for Z axis rotation measurements, an error in the calculated Z axis rotation will likely result. The severity of this effect is most likely highly case specific and will not be addressed here.

Regardless of the severity, this distortion condition is easily detected by the fact that any distortion will ALWAYS be accompanied by change in the TOTAL vector magnitude. Any external ferromagnetic material will not only cause distortion in the individual vector components but also cause the local field strength, or vector sum of the components, to exceed the local known earth field magnitude. If detected, again the gyro will be used for short duration rotation data.

In summary, it is to be appreciated that the two rate sensors discussed above can overcome the limitation of each individual sensor. With sufficient processor power, rotation information should be determined sufficiently to provide for the seamless for long term, highly accurate inertial motion capture.

Alternative Applications

The present invention has been disclosed in conjunction with numerous applications. While these applications are illustrative of preferred embodiments, they nevertheless are merely indicative of suitable applications, and are not to be considered as the only applications wherein the present invention may be used. Moreover, the probable applications for this present invention include, without limitations, golf, baseball (bat and pitching hand), tennis hockey, fly-fishing or any type of "ball and stick" sport. Note that not all applications require the full sensor array. If the singularity issue is not important relative to using the magnetometers as a differential rate sensor, the 3 gyro sensors can be left off. This is particularly true in applications where it is unlikely that there will be magnetic distortion issues such as in baseball, wooden or aluminum bats, carbon fiber tennis rackets, etc.

If the three gyros are not included in a particular embodiment, the system becomes much cheaper, lighter and smaller. Additionally, if the motion being measured is fast where no real-time bio-feedback will be employed, only post-analysis, the magnetometer singularity becomes moot. Curve fitting with pre and post singularity data will allow a very good extrapolation to the lost data. Using only pre-singularity data as needed in the real-time application will not be as good as a fit.

Data Synchronization

In order to compare measured motion data to known motion data, here are two types of data synchronization needed for the real-time bio-feedback application.

Single Variable

Single variable analysis is the simplest which is attempting to synch a single particular motion attribute with respect to time. A reference motion error file will be generated from the reference motion file stored in flash and transferred to the FRAM circular buffer, which is not used during the real-time bio-feedback mode. The FRAM is used as a convenient temporary storage for comparison to the incoming data sample by sample.

As an example, assume we are trying to compare angular position .vs. time to generate an error signal. The reference motion file data must calculate the angular position from the data as this parameter is not part of the raw data. Once calculated, a 1×N array is created in the FRAM with the $1^{st}$ entry being the synchronization trigger. By pre-calculating the reference values prior to the application, the real-time processing burden is reduced by a factor of two.

Further processing reduction can be realized by "normalizing" the stored data to the current temperature of the IMMCAP module prior to comparison to the current motion data. In this way, the real-time IMMCAP sensor data stream does not have to be temperature compensated as the stored reference data has already been adjusted in non-real-time.

With this approach, the processor merely has to calculate the parameter value from the data stream in real-time. Once the parameter is calculated, it is compared to the $1^{st}$ entry in the FRAM 1×N array. Sequential samples will be compared to the $1^{st}$ entry UNTIL a match occurs. Once the match occurs, the index into the 1×N FRAM array is incremented for each subsequent comparison to the M+1 real-time data stream.

Each comparison will result in an error value based on the difference in the Nth FRAM array entry to the Mth real-time data value. An actual error tone will be generated based on this error and other parameters such as sensitivity. This will continue until the end-of-record is reached in the FRAM buffer.

Additional speed can be realized by moving blocks for the FRAM N×1 array into local SRAM. It is unclear if this would be required but is a possibility.

Multiple Variable

In this mode, more than one motion parameter is being compared with respect to time. As an example, we could try to compare angular velocity and angular position at the same time with respect to time. In this type of application, we would need to create a 2×N array with two calculated entries from the reference motion file, i.e. angular position and angular velocity, for each time Nth increment.

As the real-time data is received, the Mth angular velocity and angular position is calculated. Depending on which parameter is used for synchronization, this parameter is used to compare to the $1^{st}$ entry in the FRAM 2×N array, most likely the angular position in this case.

Once synched, the generation of the error tone will have to be determined via a chosen algorithm which would weight the two error sources and generate the appropriate error tone. With a simple two variable example, we could generate two independent error tones, left ear for position and the right ear for velocity.

Flexible Circuits

Depending on the application, either flexible or rigid circuit boards may be used. In either case, the components will be potted and most likely have a mechanical low pass filter, ie. some kind of foam around the parts to make it robust against dropping on a hard surface.

Calibration

The initial accelerometer, magnetometer, and gyro sensitivity and offset can be determined and stored in non-volatile memory at the time of manufacture. Coefficients for temperature compensation can also be stored at this time. Due to the mature nature of the magnetometer and accelerometer sensors, it is unlikely that further calibration will be needed once in use. However, the current state of the MEMS gyros will most likely require frequent calibration to prevent excessive integration errors as previously discussed due to offset drift.

The current gyro offsets can be determined by a "calibration" mode that is executed on the start of any application. By placing the IMMCAP module in a motionless state, the uncertainty of the initial gyro offsets, i.e. sensor output with no rotation, can be greatly reduced by averaging multiple measurements over a fixed period with the offset uncertainty reduced by the square root of the number of samples Additionally, the magnetometers can dynamically determine the offset drift of the gyros with time arid temperature as well as sensitivity changes. The magnetometers can also extend the signal range of the gyros as well. The gyros have a +/−150 degree/sec signal limit, this can be extended up to about 600 deg/sec but a limit exists. If the rotation rate exceeds this limit, the output saturates and is not useful. The magnetometers acting as a differential rate sensor have no such limit and can kick in if the output of the gyroscopes saturate thereby losing accuracy in their signal simply by providing the addition digital signal processing required to extract the rate information from the real-time magnetometer data stream.

It is also to be appreciated that the IMMCAP may be formed into a 3D printed circuit board rectangular ("Borg" cube) in form. The physical configuration for the 3D (Borg) cube is quite unique as well, as the individual panels of the 3D cube is assembled in a flat form. Construction of the 3D cube (Borg cube) is similar to a box—having a box bottom, east and west side, north and south side with the box top attached to the north side. The IC's and some of the passive components are mounted on the up side of the flattened box. The majority of the passives components are on the down side of the box. Once the box is folded, the up side of the flattened box becomes the inside of a 3D cube with approx 65% of the internal volume taken up by the IC's and passives with the bottom becoming the outside of the 3D cube.

This unique configuration allows the entire 3D cube to be approximately 19 mm×17 mm×9 mm in size. This size is considerably smaller than other motion sensors currently available.

Due to the possibility of high frequency vibrations which might be imparted to the IMMCAP module through striking objects with the devices being measured, it may be advantageous to securely fix the motion sensing components within the IMMCAP module. For example, the components within the module may be potted to provide the most robust sensor, minimizing errors and structural damage during periods of high acceleration. Also, it is important to realize that many high frequency components of signals from IMMCAP sensors will be successfully filtered from the lower frequency signal by the application of low-pass filters to the outputs of the sensor leads.

Design Variations

Depending on the particular application of the present invention, three designs are contemplated. When there is no magnetic interference, i.e. no external ferromagnetic material near enough to cause a disruption in the local earth field, the accel/magnetometer is the configuration of choice if the singularity is not a issue or it can be resolved mathematically in two applications. First of all, the resolution can be done in real-time via a forward extrapolation from previous data to replace the singularity with limited but acceptable accuracy.

If magnetic disturbances are to be expected, the accel/magnetometer/gyro configuration is desirable. The gyro data can be used during the periods of the mathematical singularity and/or detected magnetic interference. By using the gyro intermittently, the accumulation of error due to noise can be minimized. Recall that the magnetometer used as a differential rate sensor has approx 13 bits of resolution while the best resolution the gyro can produce is about 8 bits with a 10 Hz bandwidth. If the start orientation is known and high magnetic interference is expected, the magnetometer is not needed if the gyro accuracy is acceptable when used standalone.

In a preferred embodiment, the system of the present invention will contain all three sensor types with the processor located elsewhere being smart enough to know when to switch from the magnetometer rate sensor to the gyro. This is easily detected as any magnetic interference from external ferromagnetic material will almost always result in the superposition resultant magnetic field vector to increase beyond that of the earth field alone as well as change the direction of the resultant vector While the particular tri-axial rate and position sensing motion capture system as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

I claim:

1. A motion capture system for measuring initial orientation and classic inertial measurement and change in spatial orientation (rho, theta, phi) and linear translation (x, y, z), comprising:
    an inertial magnetic motion capture (IMMCAP) module providing motion data;
    a digital processing unit in electrical connection with said IMMCAP module to receive said motion data;
    a means for comparing said motion data to a predefined motion data set;
    a means for analyzing said motion data based on comparing said motion data to said predefined motion data set and providing a feedback signal in response thereto; and
    a means for synchronizing said motion data to said predefined motion data set.

2. The motion capture system of claim 1, wherein said IMMCAP) module wirelessly transmits said motion data.

3. The motion capture system of claim 1, further comprising a memory, wherein said predetermined motion data set is within said memory.

4. The motion capture system of claim 3, wherein said memory is a non-volatile memory.

5. The motion capture system of claim 4 wherein said memory is a EEPROM memory.

6. The motion capture system of claim 1 wherein said IMMCAP module comprises two tri-axial sensors selected from magnetometer, accelerometer, and gyroscope.

7. The motion capture system of claim 1 wherein said IMMCAP module comprises a tri-axial magnetometer and a tri-axial accelerometer.

8. The motion capture system of claim 7, wherein said IMMCAP generates motion data in response to movement of said tri-axial magnetometer and said tri-axial accelerometer.

9. The motion capture system of claim 8, further comprising a tri-axial gyroscope.

10. An inertial magnetic motion capture (IMMCAP) module, comprising:
    a tri-axial accelerometer;
    a tri-axial magnetometer;
    means for processing an output from said accelerometer to determine an orientation of said IMMCAP module relative to the earth gravity field;
    means for processing an output from said magnetometer to determine an orientation of said IMMCAP module relative to the earth magnetic field; and
    means for processing said orientation of said IMMCAP module relative to the earth gravity field and said orientation of said IMMCAP module relative to the earth magnetic field to determine an orientation of said IMMCAP module.

11. The IMMCAP module of claim 10, further comprising:
    a tri-axial gyroscope.

12. The IMMCAP module of claim 10, wherein said IMMCAP module further comprises conditioning circuits in electrical connection with each said tri-axial accelerometer, and each said tri-axial magnetometer.

13. The IMMCAP module of claim 12, wherein said conditioning circuit further comprises low pass filters.

14. The IMMCAP module of claim 12, wherein said conditioning circuit further comprises a gain circuit.

15. A method for measuring motion using an inertial magnetic motion capture (IMMCAP) module, comprising the steps of:
   initializing said IMMCAP module;
   generating motion data in response to motion of said IMMCAP module;
   analyzing said motion data for predefined characteristics;
   generating a feedback signal in response to said analysis;
   storing said motion data in memory;
   comparing said stored motion data to predefined motion data; and
   generating an error responsive to said comparison; and
   synchronizing said motion data to said predefined motion data.

16. The method of claim 15, further comprising:
   selecting a range for said motion data from a group of predefined motion data ranges.

17. The method of claim 16, further comprising:
   comparing said motion data to said selected predefined motion data range and generating an error condition if said motion data is outside said selected predefined motion data range.

18. The method of claim 15, wherein said means for synchronizing said motion data further comprises identifying a trigger event in said motion data and synchronizing said trigger event to a predefined event in said predefined motion data.

19. The method of claim 15, further comprising:
   providing three accelerometers in said IMMCAP module to measure accelerations along three different directions, respectively;
   providing three magnetometers in said IMMCAP module to measure magnetic fields along three different directions, respectively;
   processing output from said three accelerometers to determine an orientation of said IMMCAP module relative to the earth gravity field;
   processing output from said three magnetometers to determine an orientation of said IMMCAP module relative to the earth magnetic field; and
   processing said orientation of said IMMCAP module relative to the earth gravity field and said orientation of said IMMCAP module relative to the earth magnetic field to determine an orientation of said IMMCAP module.

* * * * *